United States Patent
Magarida et al.

(10) Patent No.: US 8,181,619 B2
(45) Date of Patent: May 22, 2012

(54) VEHICLE HAVING IDLING STOP CONTROL AND CONTROL METHODS THEREOF

(75) Inventors: Naofumi Magarida, Susono (JP);
Fumiaki Hattori, Mishima (JP);
Koichiro Nakatani, Mishima (JP);
Michio Furuhashi, Numazu (JP);
Tomoyuki Kogo, Gotenba (JP); Shinobu Ishiyama, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 256 days.

(21) Appl. No.: 11/792,494

(22) PCT Filed: Jul. 11, 2006

(86) PCT No.: PCT/JP2006/314135
§ 371 (c)(1),
(2), (4) Date: Jun. 7, 2007

(87) PCT Pub. No.: WO2007/007897
PCT Pub. Date: Jan. 18, 2007

(65) Prior Publication Data
US 2008/0109149 A1     May 8, 2008

(30) Foreign Application Priority Data

Jul. 13, 2005 (JP) ................................ 2005-204349

(51) Int. Cl.
*F02N 11/08* (2006.01)
(52) U.S. Cl. ................................. 123/179.4; 123/179.5
(58) Field of Classification Search .................. 701/114; 123/479; 340/507, 635; 702/130, 99; 73/114.61, 73/116.01–116.09, 117.01–117.03, 118.01; F02N 11/08
See application file for complete search history.

(56) References Cited

U.S. PATENT DOCUMENTS

| | | | |
|---|---|---|---|
| 4,364,343 A | 12/1982 | Malik | |
| 5,153,835 A * | 10/1992 | Hashimoto et al. | 701/114 |
| 7,337,772 B2 * | 3/2008 | Yasui et al. | 123/697 |
| 7,524,106 B2 * | 4/2009 | Higashiyama et al. | 374/145 |
| 2002/0117338 A1 | 8/2002 | Itou | |

FOREIGN PATENT DOCUMENTS

| | | |
|---|---|---|
| CN | 1472091 A | 2/2004 |
| CN | 1619126 A | 5/2005 |
| EP | 1 382 826 A2 | 1/2004 |
| EP | 1 382 842 A2 | 1/2004 |
| JP | 6-257484 | 9/1994 |
| JP | 2002-349370 | 12/2002 |
| JP | 2003-293926 | 10/2003 |
| JP | 2004-143934 A | 5/2004 |
| JP | 2004-176569 | 6/2004 |
| JP | 2004-218606 A | 8/2004 |
| JP | 2005-106057 A | 4/2005 |

* cited by examiner

*Primary Examiner* — Noah Kamen
*Assistant Examiner* — Keith Coleman
(74) *Attorney, Agent, or Firm* — Kenyon & Kenyon LLP

(57) ABSTRACT

In a device for controlling idling stop of an engine in which the idling stop is carried out when a temperature of the engine that is about to be stopped by the idling stop is higher than a threshold value, when the start improvement device does not function normally, the idling stop is prohibited regardless of engine temperature. Thus, the problem in which the engine cannot be restarted satisfactorily does not occur.

13 Claims, 6 Drawing Sheets

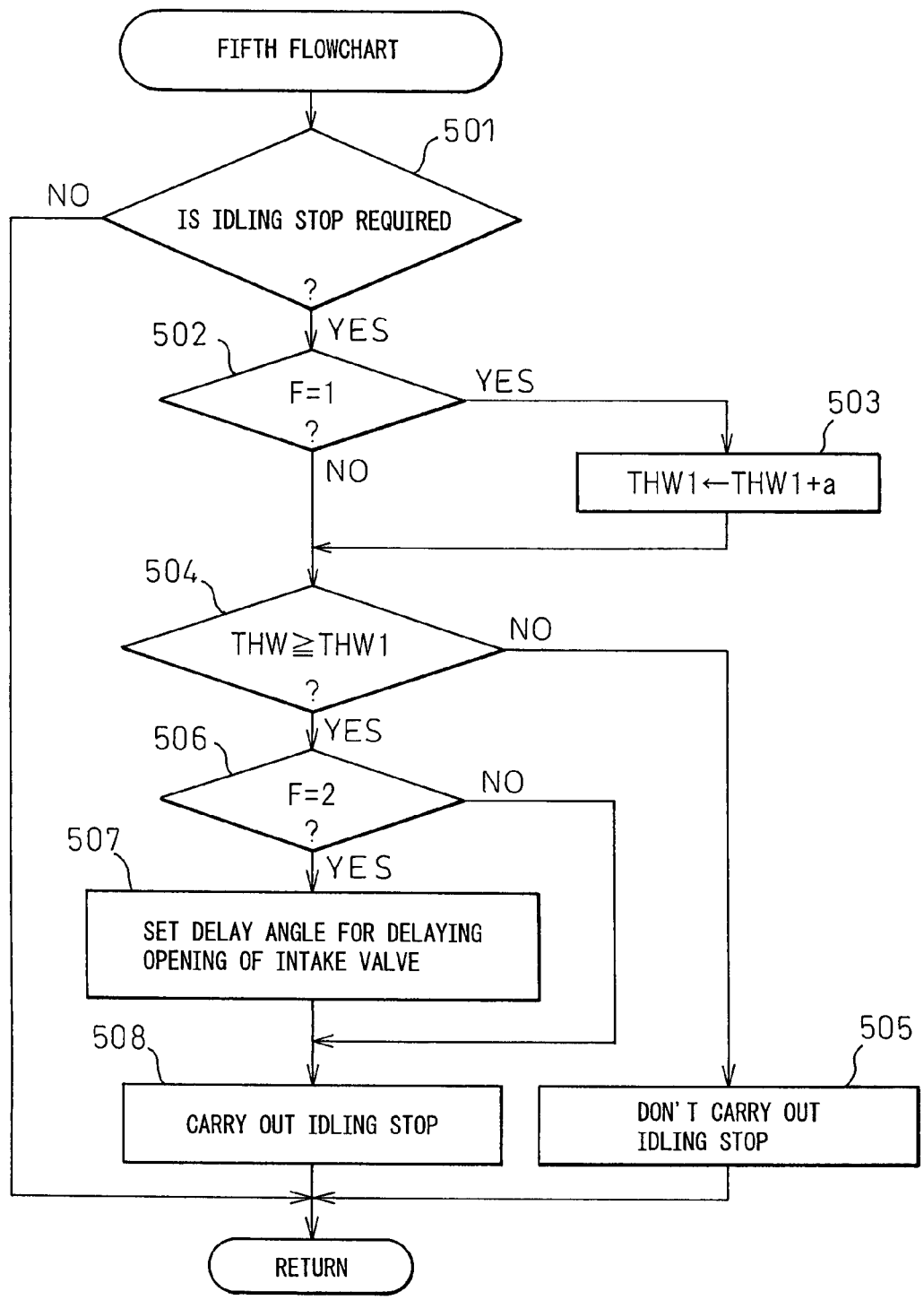

VEHICLE HAVING IDLING STOP CONTROL AND CONTROL METHODS THEREOF

This is a 371 national phase application of PCT/JP2006/314135 filed 11 Jul. 2006, which claims priority of Japanese Patent Application No. 2005-204349 filed 13 Jul. 2005, the contents of which are incorporated herein by reference.

TECHNICAL FIELD

The present invention relates to a device for controlling the idling stop of an engine.

BACKGROUND ART

To reduce fuel consumption, an idling stop control in which idling is stopped while a vehicle is stopped, for example, to wait for the stoplight to turn, begins applying to vehicles. In this case, the engine must be restarted certainly when a driver start the vehicle. Accordingly, when an engine temperature when the engine is about to be stopped by the idling stop control is lower than a predetermined temperature, which makes it difficult to restart the engine, the idling stop is not carried out.

In the case of a diesel engine, the temperature within each cylinder is increased by using a glow plug. Glow plug control when restarting a stopped engine by idling stop control, has been suggested (refer to, for example, Japanese Unexamined Patent Publications Nos. 2004-176569, 6-257484, 2003-293926, and 2002-349370).

The above suggestion relates to control for reducing electric power consumption of the glow plug. Accordingly, though there is no clear description, when the engine is provided with a start improvement device such as a glow plug or an intake air heating device for heating intake air, even if an engine temperature when the engine is about to be stopped by the idling stop control is lower than a usual temperature predetermined when the engine is not provided with a start improvement device, the engine can be restarted by the improvement of the engine restart. Therefore, when the engine is provided with a start improvement device, a threshold value of the engine temperature for determining if the idling stop is carried out is set lower than the usual predetermined temperature.

Accordingly, when the engine is provided with a start improvement device, even if the engine temperature when the engine is about to be stopped by the idling stop control is relatively low, the idling stop can be carried out. However, if the start improvement device does not function normally, an engine stopped by the idling stop cannot be restarted easily.

Therefore, an object of the present invention is to provide a device, for controlling the idling stop of an engine, in which idling stop is carried out when the engine temperature of an engine that is about to be stopped by the idling stop control is higher than a threshold value, and which allows an engine to be restarted even if a start improvement device does not function normally.

DISCLOSURE OF THE INVENTION

According to claim 1 of the present invention, there is provided a device for controlling idling stop of an engine which is provided with a start improvement device, in which idling stop is carried out when an engine temperature of the engine that is about to be stopped by the idling stop is higher than a threshold value, characterized in that when the start improvement device does not function normally, the idling stop is prohibited regardless of engine temperature.

According to claim 2 of the present invention, there is provided a device for controlling idling stop of an engine which is provided with a start improvement device, in which idling stop is carried out when an engine temperature of the engine that is about to be stopped by the idling stop is higher than a threshold value, characterized in that when the start improvement device does not function normally, the threshold value is increased by a set temperature.

According to claim 3 of the present invention, there is provided a device for controlling idling stop of an engine of claim 2, characterized in that when the start improvement device does not function normally, if a degree of the abnormal condition of the start improvement device is high, the threshold value is increased by the set temperature, and if the degree of the abnormal condition is low, another start improvement device with the start improvement device is operated when the engine stopped by the idling stop is restarted.

According to the device for controlling the idling stop of the engine of claim 1, the idling stop is carried out when the engine temperature of an engine that is about to be stopped by the idling stop is higher than a threshold value. In this case, when the engine temperature is slightly higher than the threshold value which is based on the assumption that the start improvement device functions normally, if the start improvement device does not function normally, the engine stopped by the idling stop cannot be restarted easily. However, when the start improvement device does not function normally, idling stop is prohibited regardless of the engine temperature, and thus the problem in which the engine stopped by the idling stop cannot be restarted easily does not occur.

According to the device for controlling the idling stop of the engine of claim 2, the idling stop is carried out when the engine temperature of an engine that is about to be stopped by the idling stop is higher than a threshold value. In this case, when the engine temperature is slightly higher than the threshold value which is based on the assumption that the start improvement device functions normally, if the start improvement device does not function normally, the engine stopped by the idling stop cannot be restarted easily. However, when the start improvement device does not function normally, the threshold value is increased by a set temperature and thus the idling stop is not carried out when the engine temperature is slightly higher than the threshold value which is based on the assumption that the start improvement device functions normally. Therefore, the problem in which the engine stopped by the idling stop cannot be restarted easily does not occur. Moreover, even if the start improvement device does not function normally, when the engine temperature is higher than the threshold value increased by the set temperature, the engine stopped by the idling stop can be restarted easily and thus the idling stop is carried out to reduce fuel consumption.

According to the device for controlling the idling stop of the engine of claim 3, in the device for controlling the idling stop of the engine of claim 2, only when a degree of the abnormal condition of the start improvement device is high, the threshold value is increased by the set temperature, and when the degree of the abnormal condition is low, another start improvement device with the start improvement device is operated when the engine stopped by the idling stop is restarted. Thus, when the engine temperature is slightly higher than the threshold value which is based on the assumption that the start improvement device functions normally, if the start improvement device does not function normally and a degree of the abnormal condition thereof is high, the idling stop is not carried out to prevent the problem in which the engine stopped by the idling stop cannot be restarted easily. If the degree of the abnormal condition thereof is low, another start improvement device is operated to combine with the start improvement device and thus the engine stopped by the idling stop to reduce fuel consumption can be restarted easily.

BRIEF DESCRIPTION OF THE DRAWINGS

FIG. 6 is a fifth flowchart for controlling idling stop.

BEST MODE FOR CARRYING OUT THE INVENTION

Figure 1:
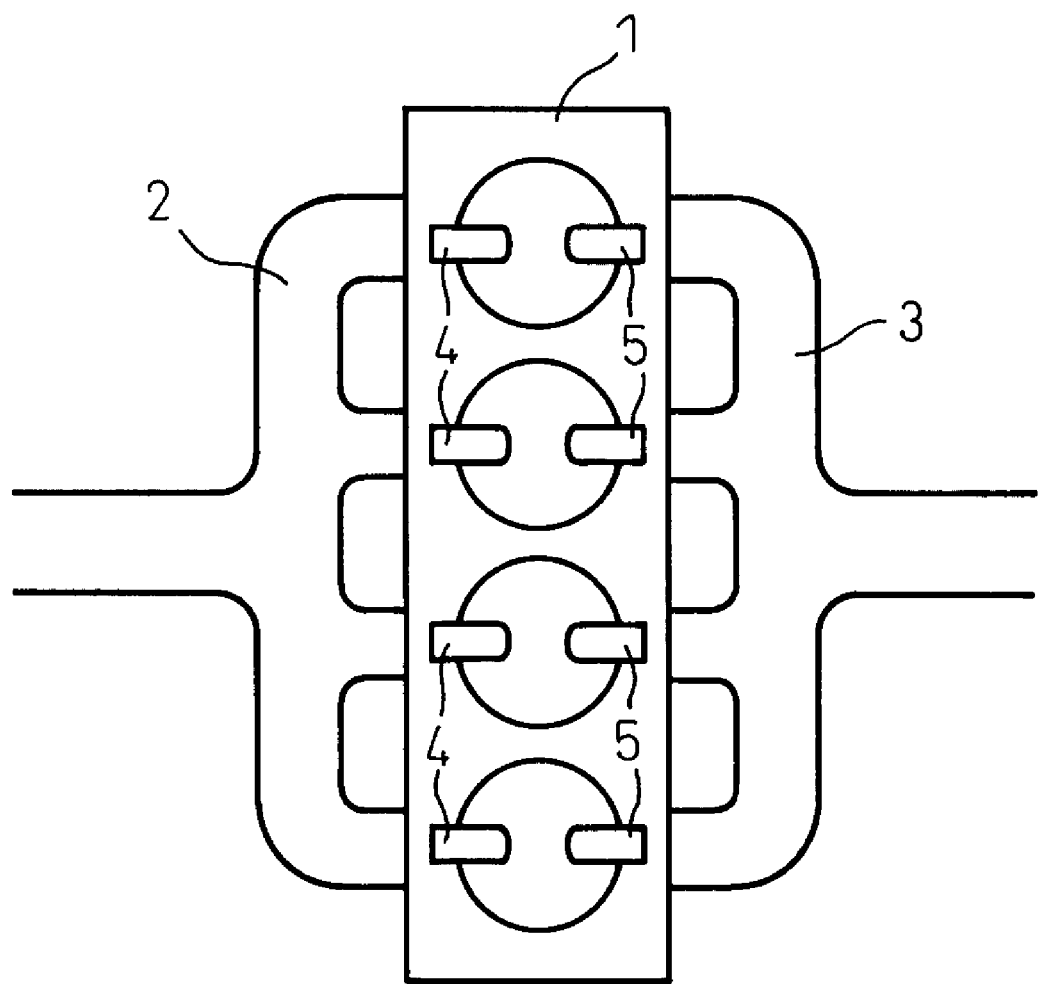
FIG. 1 is a schematic view showing a diesel engine in which a device for controlling idling stop according to the present invention is mounted.

FIG. 1 is a schematic view showing a diesel engine in which a device for controlling an idling stop according to the present invention is mounted. In FIG. 1, reference numeral 1 is an engine body, reference numeral 2 is an intake manifold, and reference numeral 3 is an exhaust manifold. In the engine body 1, for example four cylinders are provided, and in each cylinder, a fuel injector 4 for injecting fuel directly into the cylinder and a glow plug 5 for increasing the temperature within the cylinder at the time of starting a cold engine are arranged.

After the engine has been started by use of an ignition switch, when the vehicle is stopped at a stoplight and, for example, when a driver shifts the shift lever of an automatic transmission to the neutral or parking position (or the shift lever of the manual transmission to the neutral position), the vehicle is stopped for a while. At this time, the device for controlling the idling stop stops the fuel injection in order to stop the idling and thus fuel consumption is reduced. In this case, when the driver starts the vehicle, and shifts the shift lever of an automatic transmission to a drive position other than the neutral or parking position while depressing the brake pedal (or the shift lever of the manual transmission to, for example, the low gear position other than the neutral position while depressing the brake pedal), it is important for the vehicle stopped on the road that the engine is restarted easily.

Accordingly, immediately before stopping the engine by the idling stop control, when the starter cannot be operated satisfactorily because of low battery voltage, or when an ignition lag or a misfire occurs because an engine temperature represented by a cooling water temperature is low, and thus a large amount of unburned fuel is exhausted because a good restarting is not realized, the idling stop is prohibited.

As in the present embodiment, in the case where each cylinder is provided with the glow plug 5 as a start improvement device, a threshold value of the engine temperature for determining if the idling stop is carried out can be set at a lower temperature than the threshold value in the case where no start improvement device is provided. Namely, the threshold value of the engine temperature for determining if the idling stop is carried out can be set lower than the threshold value of the engine temperature for determining if the start improvement device is operated, and thus the idling stop is frequently carried out to reduce fuel consumption sufficiently.

However, when the engine temperature is slightly higher than the threshold value based on the assumption that the glow plugs 5 function normally and idling stop is carried out, if the glow plugs 5 do not function normally, the engine cannot be restarted satisfactorily. The device for controlling the idling stop according to the present embodiment intends to prevent the problem in which the engine stopped by the idling stop cannot be restarted easily.

Figure 2:
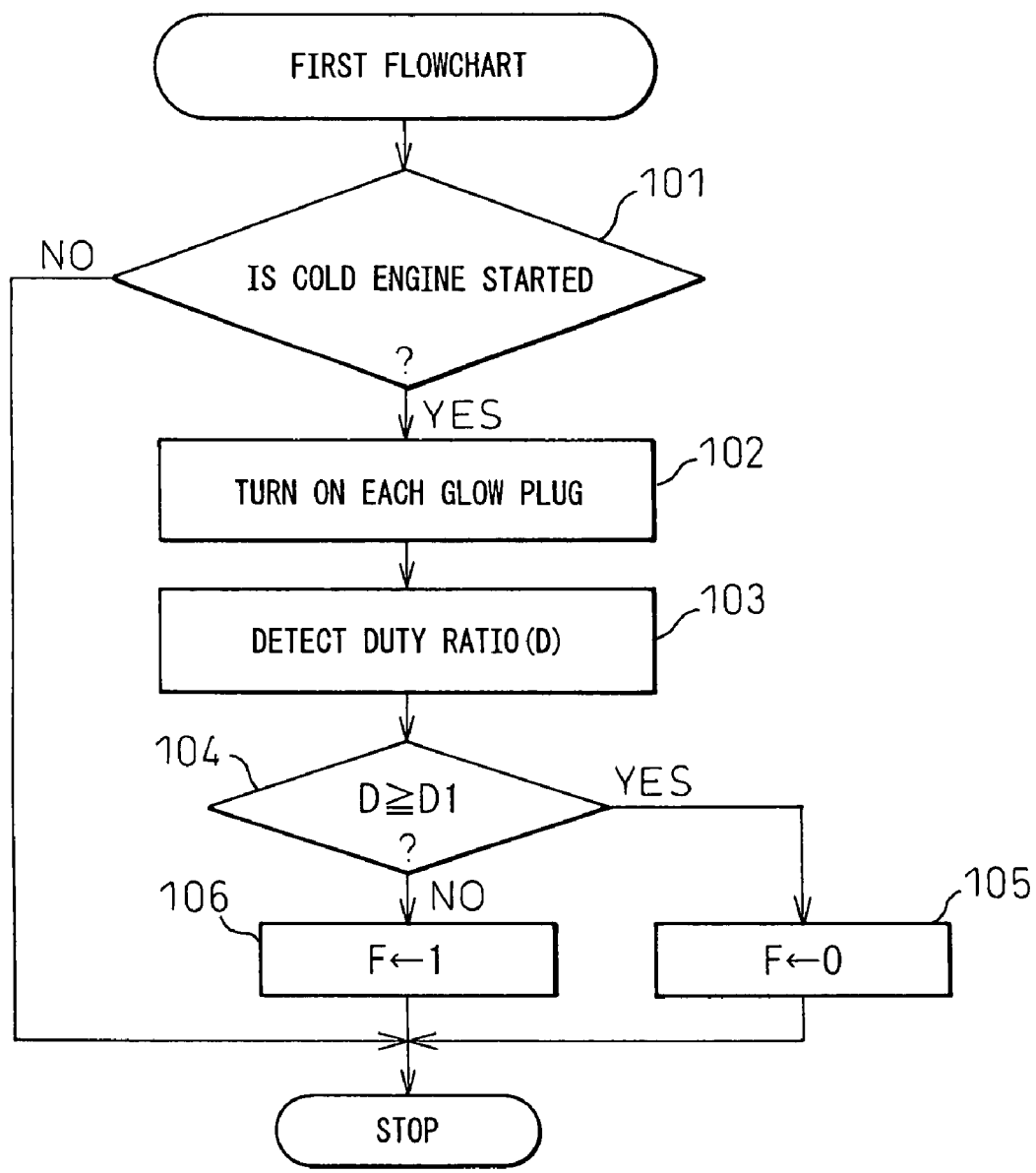
FIG. 2 is a first flowchart for determining if glow plugs function normally.

FIG. 2 is a first flowchart for determining if the glow plugs 5 function normally. This flowchart starts when the ignition switch is on or when the engine becomes a stable condition such as the idling. First, at step 101, it is determined if the engine temperature represented by the cooling water temperature or the like (or the ambient temperature) is lower than a predetermined temperature, i.e., if the cold engine is started. When the result at step 101 is negative, the warm engine is started and thus the glow plugs 5 are not required to be operated. Therefore, the fuel injectors 4 inject fuel to start the engine and the routine is stopped. On the other hand, when the result at step 101 is positive, the cold engine is started. Therefore, at step 102, each glow plug 5 is operated to increase the temperature within the cylinders and thereafter the fuel injectors 5 inject fuel to start the engine.

Next, the battery is charged by the electric power consumed when the glow plugs 5 are operated. At step 103, a duty ratio (D) of the alternator generation set for this charging is detected. If each glow plug 5 functions normally, the total electric power consumed when the glow plugs 5 are operated should become large and the duty ratio (D) of the alternator generation also becomes large. On the other hand, when in at least one glow plug 5, a wire breaks and the electric power is not consumed, the total electric power consumed when the glow plugs are operated becomes small and the duty ratio (D) of the alternator generation also becomes small.

Therefore, at step 104, it is determined if the duty ratio (D) is larger than a set value (D1). When the result is positive, all glow plugs 5 function normally and at step 105, a flag (F) is set 0. On the other hand, when the result at step 104 is negative, something is wrong with at least one glow plug 5, the glow plugs as a whole do not function normally and the flag (F) is set 1.

Figure 3:
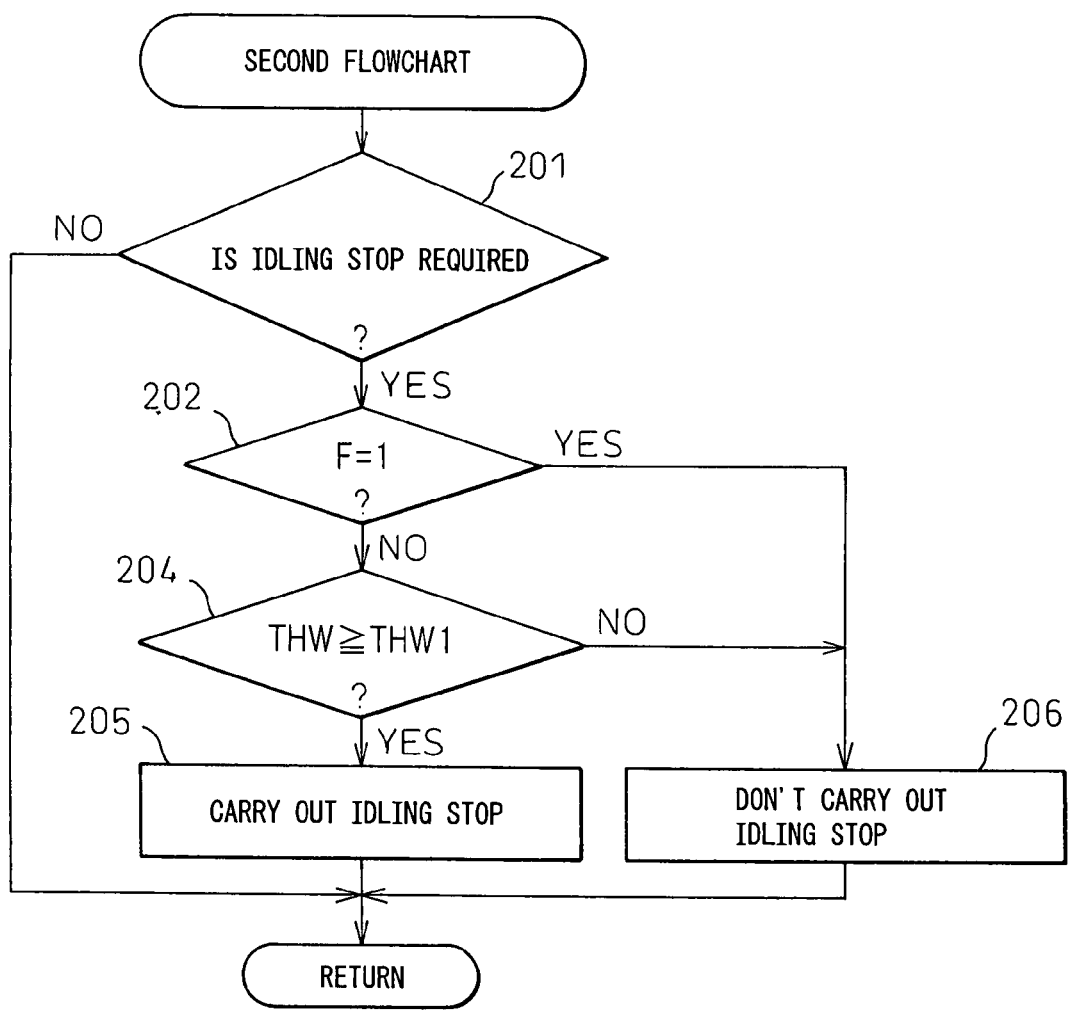
FIG. 3 is a second flowchart for controlling idling stop.

FIG. 3 is a second flowchart for carrying out the idling stop control. First, at step 201, it is determined if the idling stop is required on the basis of the shift lever position in the stopped vehicle. When the result is negative, the routine is stopped. On the other hand, when the idling stop is required, the routine goes to step 202 and it is determined if the flag (F) set on the first flowchart is 1. When the result is negative, i.e., the flag (F) is 0 and the glow plugs as a whole function normally, it is determined if the engine temperature (THW) represented by the cooling water temperature when the engine is about to be stopped by the idling stop is equal to or larger than the threshold value (THW1) at step 204. When the result is positive, the idling stop is carried out at step 205. On the other hand, when the result at step 204 is negative, idling stop is not carried out at step 206.

If idling stop is carried out, when the driver shifts the shift lever position and intends to start the vehicle, the engine must be restarted easily. For the purpose, the intake air sucked in the intake stroke at the engine restarting is heated by the compression in the compression stroke, is also heated by the heating of the glow plug 5 for a few seconds (which may be shorter than the normal time when the cold engine is started), and its temperature must increase up to a temperature at which the injected fuel ignites certainly. Here, the lowest engine temperature to which the engine can be restarted is the threshold value (THW1) used at step 204. Here, the engine temperature is measured immediately before the idling stop is carried out. Therefore, there is a period in which the idling is stopped until the engine is restarted. Accordingly, the threshold value (THW1) is preferably determined to take into account a drop in the engine temperature on the basis of the outside temperature for the above estimated period.

Namely, when the temperature (THW) of the engine that is about to be stopped by the idling stop control is lower than the threshold value (THW1), even if the glow plugs 5 is on for a few seconds, the temperature within the cylinders at the end of the compression stroke does not increase enough temperature to ignite the injected fuel and thus the engine stopped by the idling stop cannot be restarted satisfactorily. Therefore, when the result at step 204 is negative, even if the glow plugs at a whole function normally, idling stop is not carried out at step 206.

When the result at step 202 is positive, namely, when the glow plugs as a whole do not function normally, idling stop is not carried out at step 206 regardless of engine temperature. When the temperature (THW) of the engine that is about to be stopped by the idling stop is slightly higher the threshold value (THW1), if idling stop is carried out in spite that the glow plug 5 does not function normally, the engine cannot be restarted satisfactorily. However, the idling stop is not carried out at this time so that the problem in which the engine cannot be restarted satisfactorily does not occur.

Figure 4:
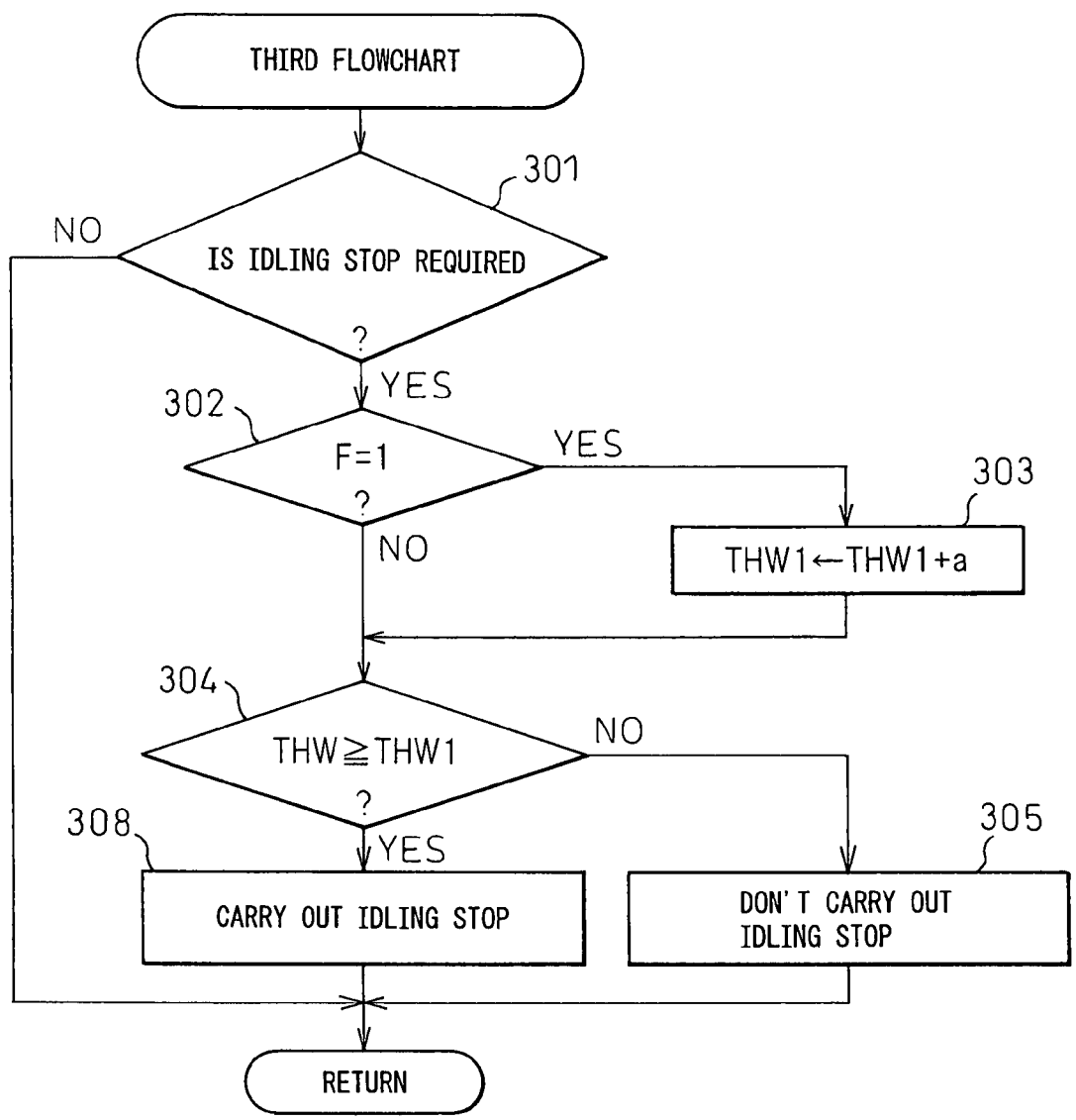
FIG. 4 is a third flowchart for controlling idling stop.

FIG. 4 is a third flowchart for carrying out the idling stop control. The differences between the present flowchart and the second flowchart are explained. In the third flowchart, when the result at step 302 is positive and the glow plugs 5 as a whole do not function normally, the idling stop is not prohibited and at step 303, the threshold value (THW1) of the engine temperature is changed to increase by a set temperature (a).

As mentioned above, the threshold value (THW1) of the engine temperature for determining if the idling stop is carried out is initially based on the assumption that the glow plugs function normally to increase the temperature within the cylinders. Accordingly, in the second flowchart in which the initial threshold value (THW1) is used to determine if idling stop is carried out, the idling stop is prohibited when the glow plugs 5 do not function normally. However, if the engine temperature is sufficiently high, it is not required that the glow plugs 5 heat the intake air at the time of engine restarting. Namely, even if the glow plugs 5 do not function normally, when the temperature (THW) of the engine that is about to be stopped by the idling stop is higher than a new threshold value that is increased by the set temperature (a), the idling stop is carried out and thus the engine can be restarted satisfactorily even if the glow plugs 5 do not function normally.

Namely, in the present flowchart, when the glow plugs 5 do not function normally, idling stop is not carried out at the engine temperature that requires the operations of the glow plugs 5 to realize the satisfactory restarting, and idling stop is carried out at the engine temperature that does not require the operations of the glow plugs 6 to realize the satisfactory restarting. Thus, the idling stop is frequently carried out to reduce the fuel consumption sufficiently. When the temperature (THW) of the engine that is about to be stopped is higher slightly than the initial threshold value (THW1), if idling stop is carried out in spite that the glow plugs 5 do not function normally, the problem in which the engine cannot be restarted satisfactorily occurs. However, according to the present flowchart, this problem does not occur.

Figure 5:
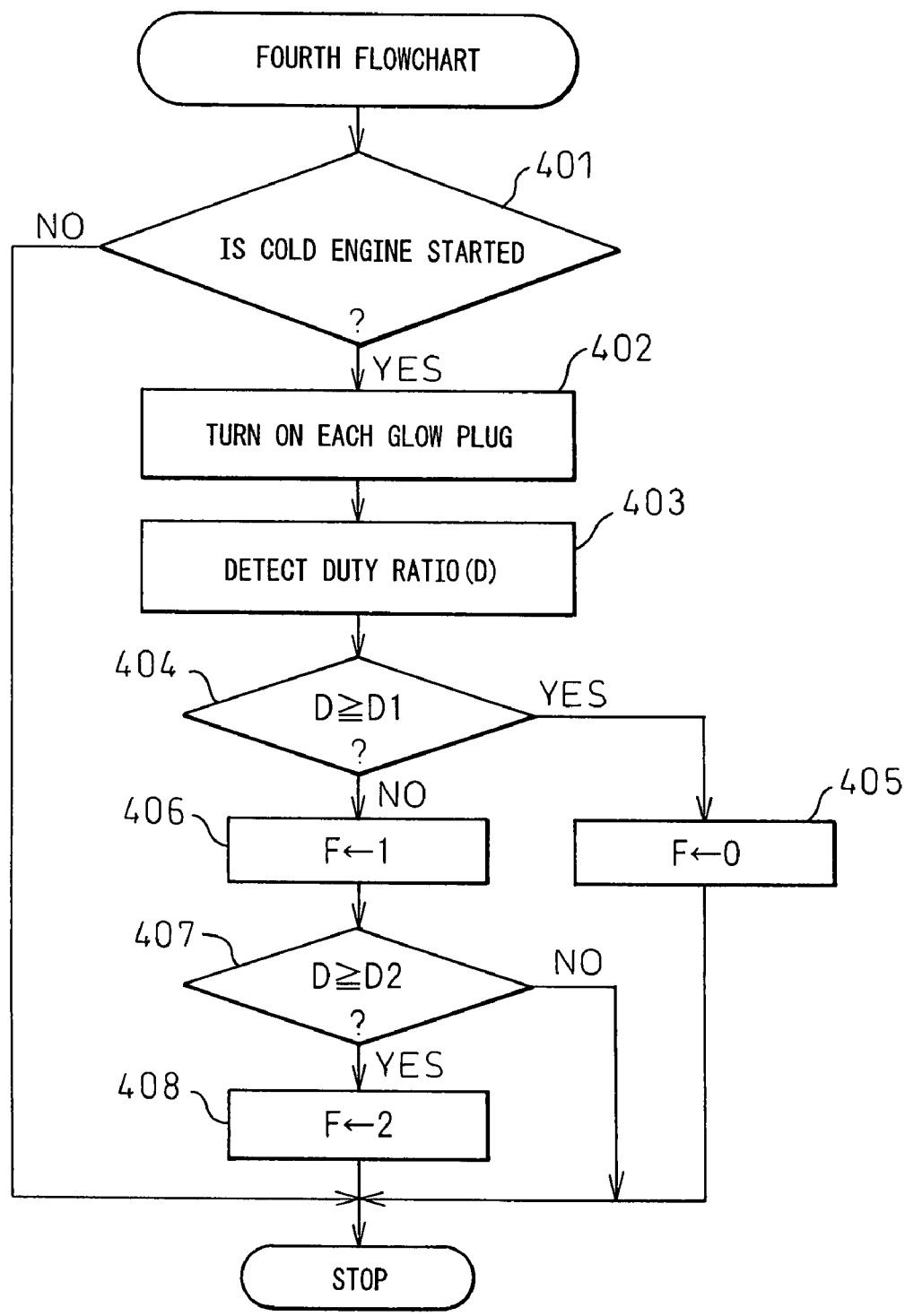
FIG. 5 is a fourth flowchart for determining if glow plugs function normally.

FIG. 5 is a fourth flowchart for determining if the glow plugs 5 function normally. The differences between the present flowchart and the first flowchart are explained. In the fourth flowchart, when the measured duty ratio (D) of the alternator generation is smaller than the set value (D1) and the glow plugs 5 as a whole do not function normally, the flag (F) is set 1 at step 406 and thereafter it is determined if the measured duty ratio (D) is equal to or larger than another set value (D2) that is smaller than the set value (D1) at step 407. When the result is negative, the measured duty ratio (D) is very small and the flag (F) is kept at 1. On the other hand, when the result at step 407 is positive, the measured duty ratio (D) is not very small and the flag (F) is set 2 at step 408.

As mentioned above, the duty ratio (D) of the alternator generation corresponds to the electric power consumed in the glow plugs when the ignition switch is turned on at the time of starting a cold engine. Therefore, when the duty ratio (D) is larger than the set value (D1) and is sufficiently large, the glow plugs as a whole function normally. At this time, the flag (F) is 0. On the other hand, when the duty ratio (D) is smaller than the set value (D2) that is smaller than the set value (D1), a degree of the abnormal condition in which the glow plugs as a whole do not function normally is large such that at least one glow plug 5 does not function at all by the snapping of the wire. At this time, the flag (F) is 1. Furthermore, when the duty ratio (D) is smaller than the set value (D1) and is larger than the set value (D2), the degree of the abnormal condition in which the glow plugs as a whole do not function normally is small such that the amount of generated heat for all or some of the glow plugs 5 drops due to the deterioration or the like. At this time, the flag (F) is 2.

FIG. 6 is a fifth flowchart showing the carrying out of the idling stop control. The differences between the present flowchart and the third flowchart are explained. In the fifth flowchart, similar to the third flowchart, when the degree of the abnormal condition in which the glow plugs 5 as a whole do not function normally is large and the flag (F) is 1, the threshold value (THW1) of the temperature of the engine that is about to be stopped by the idling stop control is changed so as to be increased by the set temperature (a). When the degree of the abnormal condition in which the glow plugs 5 as a whole do not function normally is small and the flag (F) is 2, the threshold value (THW1) is not changed and it is determined if the temperature (THW) of the engine that is about to be stopped by the idling stop control is equal or larger than the initial threshold value (THW1).

When the result is negative, as the glow plugs 5 as a whole function normally and the flag (F) is 0, idling stop is not carried out at step 505. On the other hand, when the result at step 504 is positive, idling stop is not immediately carried out. If the flag (F) is 2, the result at step 506 is positive and at step 507, in a variable valve timing mechanism provided as another start improvement device other than the glow plugs 5a, a delay angle for delaying the opening of the intake valve is set at the time of engine restarting. Thereafter, idling stop is carried out at step 508.

According to the present flowchart, when the degree of the abnormal condition in which the glow plugs 5 as a whole do not function normally is large (for example, at least one glow plug 5 does not function at all by the snapping of the wire and the flag (F) is set 1), the threshold value of the engine temperature for determining if the idling stop is carried out is increased by the set temperature, like the third flowchart. Thus, only when the glow plugs 5 are not required at the time of engine restarting, idling stop is carried out.

On the other hand, when the degree of the abnormal condition in which the glow plugs 5 as a whole do not function normally is small (for example, the amount of generated heat for all or some of the glow plugs 5 drops due to the deterioration or the like and the flag (F) is set 2), the threshold value of the engine temperature for determining if the idling stop is carried out is maintained at the initial value and thus idling stop is carried out even if the operations of the glow plugs 5 are required at the time of engine restarting. However, the amount of generated heat of the glow plug 5 is not enough to restart the engine satisfactorily. Therefore, anther start improvement device also is used.

In the present embodiment, the variable valve timing mechanism as another start improvement device is utilized to delay the opening of the intake valve and utilize the work produced by the piston while the intake valve is closed at the intake stroke for heating the intake air to compensate for insufficient heat generated by the glow plugs 5. The smaller the amount of heat generated by the glow plug 5 is, i.e., the smaller the duty ratio (D) of the alternator generation is, the larger the delay angle for delaying the opening of the intake valve is set at step 507. Thus, the work produced by the piston while the intake valve is closed at the intake stroke increases. Accordingly, at this time, even if idling stop is carried out, the engine can be restarted satisfactorily. Moreover, idling stop is frequently carried out to reduce the fuel consumption.

A variable valve timing mechanism is not provided only as the start improvement device, but also controls the opening timing of the intake valve and the closing timing of the exhaust valve so as to realize a suitable valve overlap in each engine operating condition. When the glow plugs 5 as a whole function normally, if the variable valve timing mechanism is always used as another start improvement device with the start improvement device, the threshold value (THW1) of the engine temperature for determining if the idling stop is carried out can be set lower. However, when the variable valve timing mechanism is used as the start improvement device, the variable valve timing mechanism makes the intake valve be close during a part of the intake stroke at the timing of the cranking of the restarting and thus a high load is given to the starter motor so as to shorten its life. Accordingly, as in the fifth flowchart, it is preferable that the variable valve timing mechanism be used as another start improvement device only when the degree of the abnormal condition of the glow plugs 5 is small.

In the first and fourth flowcharts, the duty ratio (D) of the alternator generation that corresponds to the electric power consumption in the glow plugs 5 is utilized to determine if the glow plugs 5 function normally. However, if electric current in the glow plugs 5 is detected, when the electric current is larger than a set value, it may be determined that the glow plugs 5 function normally. Furthermore, if a change of battery voltage before and after turning on electricity to the glow plugs is detected, when the change is larger than a set value, it may be determined that the glow plugs 5 function normally. These determinations are not limited to be carried out at the time of cold starting by use of the ignition switch, but may also be carried out at any time or immediately before carrying out of the idling stop control.

If battery voltage measured when the engine is about to be stopped by the idling stop control is low, battery voltage at the time of engine restarting is also low and thus the glow plugs cannot function normally. Therefore, at this time, the flag (F) may be 1 or 2.

In the above mentioned embodiments, the glow plugs 5 are used as the start improvement device. An intake air heating device for heating the intake air in the surge tank of the intake system or the like can be used as the start improvement device. The intake air heating device is an electrical-type and thus it can be determined if it functions normally like the case of the glow plugs. As a start improvement means instead of glow plugs 5, the atomization degree of fuel injected by the fuel injector 4 may be increased. For example, if the injection pressure is increased, the injected fuel is atomized smaller. Accordingly, a common rail of the fuel injection system can be used as the start improvement device. If the fuel pressure within the common rail when the engine is about to be stopped by the idling stop control is higher than a set value, the sufficient atomized fuel can be injected at the time of engine restarting and thus the start improvement device may function normally. An electrical-type high pressure pump is arranged on the common rail as the start improvement device and the injected fuel may be pressurized. The electrical-type high pressure pump can be determined if it functions normally like the case of the glow plugs.

The intake air heating device and electrical-type high pressure pump can be used as another start improvement device instead of the variable valve timing mechanism. The present invention may not only be applied to a diesel engine, but also a gasoline engine. In this case, the intake air heating device or a fuel injection system at the time of engine starting for injecting fuel into the surge tank to supply sufficient atomized fuel into the cylinder can be used as the start improvement device. A variable valve timing mechanism can also be used as the start improvement device or another start improvement device.

LIST OF REFERENCE NUMERALS

1: engine body
2: intake manifold
3: exhaust manifold
4: fuel injector
5: glow plug

The invention claimed is:

1. A vehicle, comprising:
   an internal combustion engine;
   a glow plug for heating the intake air of the engine; and
   a controller programmed to control idling stop of the engine when a temperature of the engine that is about to be stopped by the idling stop is higher than a threshold value corresponding to the lowest temperature at which the engine can be restarted, the controller further programmed to control the glow plug,
   wherein when the glow plug does not function normally, the threshold value is increased by a set temperature, such that the increased threshold value is the lowest temperature at which the engine can be restarted when the glow plug does not function.

2. A vehicle according to claim 1, wherein when the glow plug does not function normally, if a degree of the abnormal condition of the glow plug is large, the threshold value is increased by the set temperature, and if the degree of the abnormal condition is small, a start improvement device, different from and used in conjunction with the glow plug, is operated when the engine stopped by the idling stop is restarted.

3. A vehicle according to claim 1, wherein it is determined that the glow plug does not function normally when a detected duty ratio of an alternator generation set is less than a set value.

4. A vehicle according to claim 2, wherein it is determined that the glow plug does not function normally when a detected duty ratio of an alternator generation set is less than a set value.

5. A vehicle, comprising:
an internal combustion engine;
a variable valve timing mechanism utilized for heating the intake air by delaying opening of an engine intake valve;
a controller programmed to control idling stop of the engine when a temperature of the engine that is about to be stopped by the idling stop is higher than a threshold value corresponding to the lowest temperature at which the engine can be restarted, the controller further programmed to control the variable valve timing mechanism,
wherein when the variable valve timing mechanism does not function normally, the threshold value is increased by a set temperature, such that the increased threshold value is the lowest temperature at which the engine can be restarted when the variable valve timing mechanism does not function.

6. A method of controlling idling stop of an internal combustion engine, comprising:
providing a glow plug for an internal combustion engine, wherein the glow plug heats intake air for the internal combustion engine under a normal operation;
providing a controller for controlling idling stop of the engine;
stopping the engine when a temperature of the engine is higher than a threshold value corresponding to the lowest temperature at which the engine can be restarted; and
prohibiting idling stop of the engine, regardless of the engine temperature, when the glow plug does not function normally.

7. A method of controlling idling stop of an internal combustion engine, comprising:
providing a glow plug for an internal combustion engine, wherein the glow plug heats intake air for the internal combustion engine under a normal operation;
providing a controller for controlling idling stop of the engine;
stopping the engine when a temperature of the engine is higher than a threshold value corresponding to the lowest temperature at which the engine can be restarted; and
increasing the threshold value by a set temperature when the glow plug does not function normally, such that the increased threshold value is the lowest temperature at which the engine can be restarted when the glow plug does not function.

8. The method according to claim 7, further comprising detecting a duty ratio of an alternator generation set.

9. The method according to claim 8, wherein it is determined that the glow plug does not function normally when the detected duty ratio of the alternator generation set is less than a set value.

10. The method according to claim 6, further comprising:
providing a variable valve timing mechanism for heating intake air for the internal combustion engine by delaying opening of an engine intake valve,
wherein, when a degree of the abnormal condition of the glow plug is small, the variable valve timing mechanism heats the intake air to compensate for the lessened heating caused by the abnormal condition in the glow plug.

11. The method according to claim 7, further comprising:
providing a variable valve timing mechanism for heating intake air for the internal combustion engine by delaying opening of an engine intake valve,
wherein, when a degree of the abnormal condition of the glow plug is small, the variable valve timing mechanism heats the intake air to compensate for the lessened heating caused by the abnormal condition in the glow plug.

12. A method of controlling idling stop of an internal combustion engine, comprising:
providing a variable valve timing mechanism for an internal combustion engine, wherein the variable valve timing mechanism heats intake air for the internal combustion engine under a normal operation by delaying opening of an engine intake valve;
providing a controller for controlling idling stop of the engine;
stopping the engine when a temperature of the engine is higher than a threshold value corresponding to the lowest temperature at which the engine can be restarted; and
prohibiting idling stop of the engine, regardless of the engine temperature, when the variable valve timing mechanism does not function normally.

13. A method of controlling idling stop of an internal combustion engine, comprising:
providing a variable valve timing mechanism for an internal combustion engine, wherein the variable valve timing mechanism heats intake air for the internal combustion engine under a normal operation by delaying opening of an engine intake valve;
providing a controller for controlling idling stop of the engine;
stopping the engine when a temperature of the engine is higher than a threshold value corresponding to the lowest temperature at which the engine can be restarted; and
increasing the threshold value by a set temperature when the variable valve timing mechanism does not function normally, such that the increased threshold value is the lowest temperature at which the engine can be restarted when the variable valve timing mechanism does not function.

* * * * *